United States Patent
Brett et al.

(10) Patent No.: US 6,285,409 B1
(45) Date of Patent: Sep. 4, 2001

(54) METHOD AND DEVICE FOR PRODUCING FRAMES AROUND VIDEO IMAGES

(75) Inventors: Maik Brett, Hofheim A. TS; Matthias Burkert, München, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/535,705

(22) Filed: Mar. 27, 2000

Related U.S. Application Data

(63) Continuation of application No. PCT/DE98/02649, filed on Sep. 8, 1998.

(30) Foreign Application Priority Data

Sep. 26, 1997 (DE) .................................. 197 42 601

(51) Int. Cl.$^7$ .................................................. H04N 5/45
(52) U.S. Cl. .................... 348/565; 348/348; 348/563; 348/578; 348/566
(58) Field of Search .................... 348/565, 566, 348/563, 564, 578, 580, 553, 554; H04N 5/445, 5/45

(56) References Cited

U.S. PATENT DOCUMENTS

| | | |
|---|---|---|
| 4,238,773 | 12/1980 | Tsuboka et al. . |
| 4,616,262 | 10/1986 | Toriumi et al. . |
| 5,590,267 | 12/1996 | Butler et al. . |

FOREIGN PATENT DOCUMENTS

| | | |
|---|---|---|
| 195 44 139 A1 | 1/1997 | (DE) . |
| 0 539 953 A2 | 5/1993 | (EP) . |
| 2 275 585 | 8/1994 | (GB) . |
| 8163433 | 6/1996 | (JP) . |

OTHER PUBLICATIONS

Published International Application No. WO 97/24869 (Patton et al.), dated Jul. 10.

*Primary Examiner*—Sherrie Hsia
(74) *Attorney, Agent, or Firm*—Herbert L. Lerner; Laurence A. Greenberg; Werner H. Stemer

(57) ABSTRACT

A method for producing a frame around a video image includes the step of placing subframes around a base frame. The subframes have an offset with respect to the base frame, in order to generate a plastic impression of the frame. The base frame and the subframes are produced from the same frame signal. A device for producing such a frame is also provided. The method and the device are in particular used in picture-in-picture systems.

9 Claims, 1 Drawing Sheet

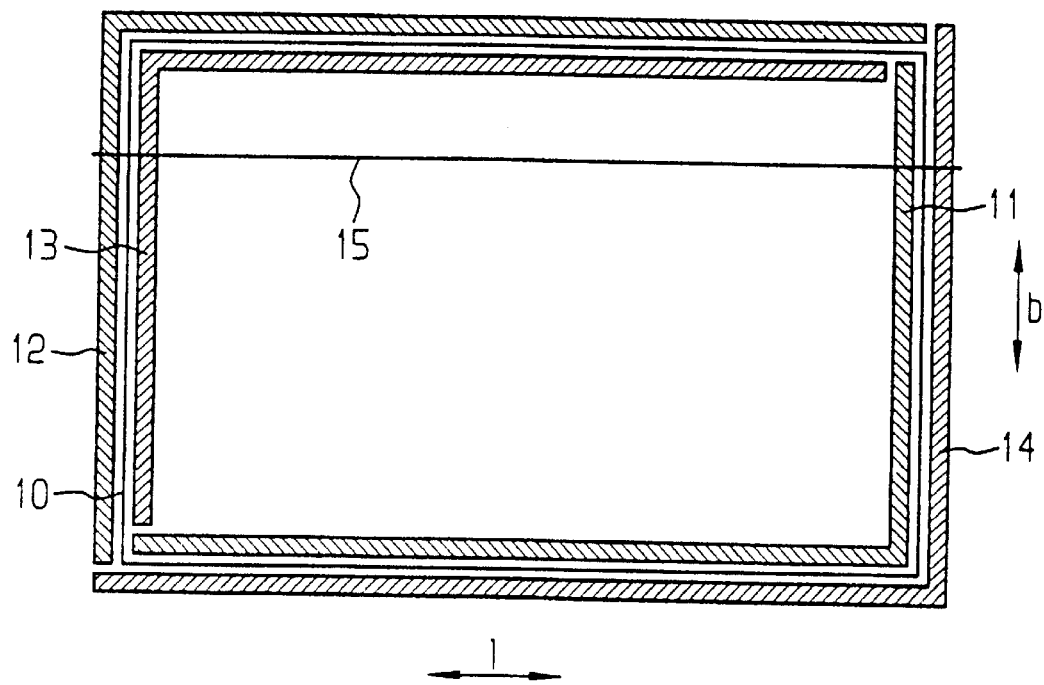
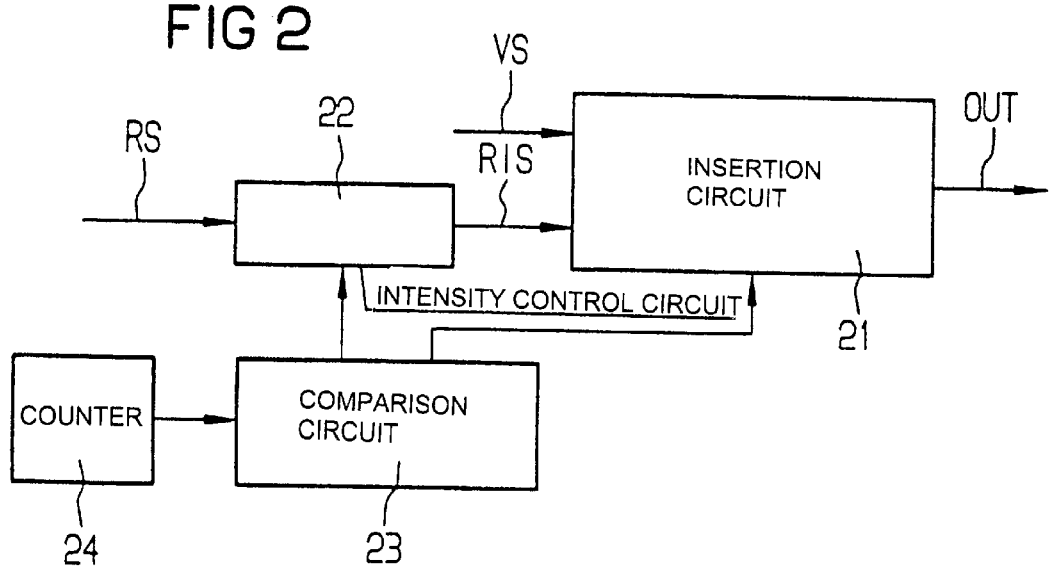

METHOD AND DEVICE FOR PRODUCING FRAMES AROUND VIDEO IMAGES

CROSS REFERENCE TO RELATED APPLICATION

This application is a continuation of International Application No. PCT/DE98/02649, filed Sep. 8, 1998, which designated the United States.

BACKGROUND OF THE INVENTION

Field of the Invention

The invention relates to a method for producing a frame around a video image, and to a device for producing a frame around a matrix-like video image, which is in particular suitable for implementing the method.

There are various applications, in particular in television technology, in which a number of images are displayed simultaneously on a screen. Systems in which a smaller picture is inserted into a main picture are known under the designation picture-in-picture systems. In this case, the main picture and inserted picture are usually transmitted on different channels or originate from different video sources.

In order to emphasize the inserted image visually from the main image, the inserted image is provided with a frame. This frame is, for example, a number of pixels wide and runs around the edge of the inserted image.

The insertion of smaller images is also used on the transmitter side at the transmitting station or broadcasting studio. For example, interview partners who are located outside the broadcasting studio are often displayed in their own window within the picture recorded in the studio with the interviewer. Here, the transition from the window to the actual image is generally not carried out seamlessly. A border, which is most often black, ensures that the window stands out from the actual picture.

Both in the case of the inserted images and in the case of the windows described, the desired high degree of distinction, which is to be achieved by the frame, is not always accomplished. In particular in the case of very dark main images or in the case of very small or very large inserted images or windows, it is difficult for the observer to distinguish the main picture immediately and easily from the inserted picture or the window.

SUMMARY OF THE INVENTION

It is accordingly an object of the invention to provide a method and a device for producing a frame around a video image which overcome the above-mentioned disadvantages of the heretofore-known methods and devices of this general type and with which a clear distinction between the main picture and the inserted picture or window is achieved. In particular in the case of the main picture and the inserted picture having an equal or similar contrast or appearance, the distinction between the two should be easily detectable.

With the foregoing and other objects in view there is provided, in accordance with the invention, a method for producing a frame around a video image, which includes the steps of:
placing a base frame having a first intensity around a video image by using a frame signal;
producing a first subframe having a second intensity by using the frame signal; and
placing the first subframe around the base frame and providing the first subframe offset with respect to the base frame in a first given direction.

In other words, in accordance with the invention, a simple, flat frame, as has been used hitherto, is expanded or extended in such a way that the impression of a plastic frame or three-dimensional frame is produced. This is achieved through the use of shadowing inside and/or outside the simple frame. The shadowing is referred to in the following text as subframes. As a result of the three-dimensional effect of the plastic frame, the distinguishing power is increased considerably by comparison with a simple, flat, two-dimensional frame. An observer of a picture having this plastic frame not only perceives the color difference between the frame and the main picture or the inserted picture, but also the difference as a result of the impression given by the three-dimensional depth of the frame.

In accordance with another mode of the invention, a second subframe having a third intensity is produced with the frame Signal. The second subframe is placed around the base frame such that the second subframe is offset with respect to the base frame in a second given direction.

In accordance with yet another mode of the invention, the base frame is a closed frame, which breaks through the first subframe.

In accordance with a further mode of the invention, the first and/or second offset direction extends diagonally with respect to the base frame.

In accordance with yet a further mode of the invention, the frame signal has a luminance component and a chrominance component. The second intensity and/or the third intensity of the first and second subframes is controlled with the luminance component.

In other words, according to one exemplary embodiment, in which the signal for forming the frame has a luminance component and a chrominance component, different shadowing effects are achieved from the signal for the frame by changing the luminance component. The color of the shadowing does not have to be additionally specified. Instead, the color of the shadowing is given by the color of the signal for the simple frame. Conventional methods for producing simple, flat frames can simply be expanded into the method according to the invention, since the conventional signal for producing the simple frame be used.

The method according to the invention also permits to switch back and forth between the conventional simple frame and the plastic, three-dimensional frame according to the invention.

With the objects of the invention in view there is also provided, a device for producing a frame around a video image, including:
a counter for counting lines and columns of a matrix-type video image and providing a counter reading;
an insertion circuit operatively connected to the counter and receiving a video image signal and a frame intensity signal for generating an output signal from the video image signal and the frame intensity signal, the insertion circuit being controllable such that in response to given values of the counter reading, the output signal includes the frame intensity signal for producing a frame around the video image, the frame having a frame intensity; and
an intensity control circuit connected to the insertion circuit for controlling the frame intensity as a function of the counter reading of the counter.

In other words, a device according to the invention for producing a plastic frame, according to one exemplary embodiment of the invention, uses elements which are also used in a device for producing a simple frame. This means that conventional devices can be extended by an expansion or upgrade in order to form devices according to the invention. The use of elements which are already present or known simplifies the development and implementation of a device according to the invention considerably.

In addition, it is advantageous that the device according to the invention can be changed over or switched between the production of a simple, flat frame and a plastic frame.

In accordance with another feature of the invention, the insertion circuit receives a frame intensity signal, which has a chrominance component and a luminance component and the intensity control circuit is configured to control the luminance component. The intensity control circuit may be configured to include a controller for controlling the luminance component.

Other features which are considered as characteristic for the invention are set forth in the appended claims.

Although the invention is illustrated and described herein as embodied in a method and device for producing frames around video images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an illustration of an exemplary frame, which can be produced with the method according to the invention and with the device according to the invention; and FIG. 2 is a schematic view of an exemplary device for producing a frame around a matrix-like video image according to the invention.

DESCRIPTION OF THE PREFERRED EMBODIMENTS

Referring now to the figures of the drawings in detail and first, particularly, to FIG. 1 thereof, there is shown an example of a frame as can be produced in accordance with the method of the invention or can be produced with a device according to the invention. The frame shown in FIG. 1 has a base frame 10 with a rectangular geometry defined by a length 1 and a height b. The base frame 10 corresponds to a conventional, flat frame. In the case of pictures which are to be framed and have a pixel-like structure, the base frame 10 is a few pixels or picture elements wide. The inner long side and the inner broad side of the base frame 10 are adjoined by a first inner part-frame 11 with an L-shape. The outer geometric dimensions of the first inner part-frame 11 correspond to the inner geometric dimensions of the base frame 10, that is to say the length of the inner side of the base frame 10 is identical to the outer length of the first inner part-frame 11. The same relationships apply to the respective widths. The remaining two inner sides of the base frame 10 are adjoined by a second inner part-frame 13, so that the first inner part-frame 11 and the second inner part-frame 13 form a rectangle. The width of the second inner part-frame 13 is smaller, by the thickness of the long side of the first inner part-frame, than the width of the first inner part-frame. Likewise, the length of the second inner part-frame is smaller, by the thickness of the broad side of the first inner part-frame 11, than the length of the first inner part-frame The sides of the base frame 10 on which the second inner part-frame 13 is located, are adjoined on the outside by the first outer part-frame 12. The length of the first outer part-frame 12 is greater, by the thickness of the broad side of the first outer part-frame 12, than the length of the base frame 10. Likewise, the width of the first outer part-frame 12 is greater, by the thickness of the long side of the first outer part-frame 12, than the width of the base frame 10. The remaining sides of the base frame 10 are adjoined, outside the base frame 10, by a second outer part-frame 14. The first outer part-frame 12 and the second outer part-frame 14 together form a closed rectangle which is referred to below as the second subframe 12, 14. The intensities of the base frame 10, first subframe 11, 12 and second subframe 13, 14 are respectively different. As a result, the observer of the frame is given the impression that the frame has depth, that is to say is plastic.

The following text now describes how a frame, for example in accordance with FIG. 1, can be produced with the method according to the invention. The base frame 10 is firstly produced from a frame signal RS like a conventional flat frame. The frame signal RS can be a color signal FS having a luminance component LU and a chrominance component CH. The base frame 10 has a first intensity. The first subframe 11, 12 is then placed around the base frame. The first subframe 11, 12 is likewise produced from the frame signal RS, but the frame signal RS is modified in such a way that the first subframe 11, 12 has a different intensity from that of the base frame 10. Preferably, the first subframe 11, 12 is provided to be offset in relation to the base frame 10. For example, starting from the base frame 10, the first subframe 11, 12 can be offset diagonally upward and to the left by its thickness or width, as described in relation to FIG. 1.

A still more intense depth effect or three-dimensional effect of the frame is achieved if, in addition to the first subframe 11, 12, a second subframe 13, 14 is provided. The second subframe 13, 14 is likewise obtained from the frame signal RS, the intensity of the second subframe 13, 14 preferably differing from the intensity of the base frame 10 and from the intensity of the first subframe 11, 12. The second subframe 13, 14 is also provided to be offset in relation to the base frame 10. For example, starting from the base frame 10, it is displaced diagonally downward and to the right, as illustrated in FIG. 1.

The best plastic effect is obtained if the base frame 10 dominates, that is to say if the base frame 10 is not interrupted at intersections with the first and second subframes 11, 12 and 13, 14. FIG. 1 shows the points at which the base frame 10 interrupts the first subframe 11, 12 and the second subframe 13, 14, respectively, when it intersects the first and second subframes.

If the color signal FS is used for the frame signal RS, the intensity of the base frame 10 and of the subframes 11, 12 and 13, 14 can be controlled merely by changing the luminance component LU. The chrominance component CH can be the same in each case.

The structure of the frame is described below using a line 15, which has been picked from the frame shown in FIG. 1.

Firstly, that part of the first outer part-frame 12, which belongs to line 15, is generated with a specific intensity for producing the frame. This is adjoined by a first part of the base frame 10. The line is continued with that part of the second inner part-frame 13 belonging to line 15. In the further course of the line, the part of the picture to be framed and belonging to line 15 can then be provided. The frame in this line is closed with that part of the first inner part-frame 11 belonging to line 15, that second part of the base frame 10 belonging to line 15 and that part of the second outer part-frame 14 belonging to line 15. The base frame 10 and the second inner part-frame 13 of line 15 have respective different intensities. These differ from the intensity of the first outer part-frame 12. The production of the further lines proceeds in an analog manner.

FIG. 2 shows an exemplary embodiment of a device for producing a frame around a matrix-like video image. Using the device, frames can be produced around video images, which are composed of pixels or picture elements, in accordance with the method of the invention.

According to FIG. 2, the device according to the invention includes an insertion circuit or superimposition circuit 21, which generates an output signal OUT from a video image signal VS and a frame intensity signal RIS.

An intensity control circuit 22 generates the frame intensity signal RIS from the frame signal RS by controlling the signal or the signals which determine the intensity of a frame produced by the frame signal. In a preferred exemplary embodiment, the frame signal RS is the color signal FS. Using the intensity control circuit 22, it is possible to control the luminance component LU of the color signal FS and therefore the intensity of a frame to be produced.

The insertion circuit 21 and the intensity control circuit 22 are each connected to an output of a comparison circuit 23. The comparison circuit 23 compares the counter readings of a counter 24 with predefinable values. Here, the counter 24 counts in lines and columns, so that each counter reading can be assigned to a specific pixel from the video image constructed from pixels. The predefinable values, which the comparison circuit 23 compares continuously with the counter reading of the counter 24, correspond to the coordinates of the base frame 10 and the subframes 11, 12 and 13, 14. Each coordinate which belongs to the base frame or to the first or second subframe is assigned an intensity value. This assignment achieves that the intensity control circuit 22 generates a frame intensity signal RIS with a first intensity for the base frame 10, with a second intensity for the first subframe 11, 12 and with a third intensity for the second subframe 13, 14. In addition, the comparison circuit 23 ensures that the insertion circuit 21 supplies the frame intensity signal RIS as output signal OUT only at the coordinate to which a frame is assigned. In the case of the other coordinates, the output signal OUT includes the signals VS of the video image.

In a further preferred embodiment, the intensity control circuit 22 can be switched off. If the intensity control circuit 22 is switched off, the frame signal RS is forwarded unchanged to the insertion circuit 21. In this case, the frame signal RS is identical to the frame intensity signal RIS. This embodiment permits a changeover or switching between a conventional, flat frame and a frame with a plastic effect.

It is noted that, within the context of this invention, the term video image is to be understood to include not only images from television receivers, video recorders or other video sources, but also images which are obtained with projecting methods, in particular cineastic methods, using for example projection apparatuses.

The method according to the invention may also be used in the case of images in broadband format or panoramic screen format which are displayed on a display area such as a conventional television screen with an length-height ratio of 4/3 for example.

We claim:

1. A method for producing a frame around a video image, which comprises:

placing a base frame having a first intensity around a video image by using a frame signal;

producing a first subframe having a second intensity by using the frame signal;

placing the first subframe around the base frame and providing the first subframe offset with respect to the base frame in a given direction;

producing a second subframe having a third intensity by using the frame signal; and placing the second subframe around the base frame and providing the second subframe offset with respect to the base frame in a further given direction.

2. The method according to claim 1, which comprises providing the further given direction as a direction extending diagonally with respect to the base frame.

3. The method according to claim 1, which comprises:

providing the frame signal with a luminance component and a chrominance component; and controlling the third intensity of the second subframe with the luminance component.

4. A method for producing a frame around a video image, which comprises:

placing a base frame having a first intensity around a video image by using a frame signal;

producing a subframe having a second intensity by using the frame signal;

placing the subframe around the base frame and providing the subframe offset with respect to the base frame in a given direction; and providing the base frame as a closed frame breaking through the subframe.

5. A method for producing a frame around a video image, which comprises:

placing a base frame having a first intensity around a video image by using a frame signal;

producing a subframe having a second intensity by using the frame signal;

placing the subframe around the base frame and providing the subframe offset with respect to the base frame in a given direction; and providing the given direction as a direction extending diagonally with respect to the base frame.

6. A method for producing a frame around a video image, which comprises:

placing a base frame having a first intensity around a video image by using a frame signal;

producing a subframe having a second intensity by using the frame signal;

placing the subframe around the base frame and providing the subframe offset with respect to the base frame in a given direction;

providing the frame signal with a luminance component and a chrominance component; and controlling the second intensity of the subframe with the luminance component.

7. A device for producing a frame around a video image, comprising:

a counter for counting lines and columns of a matrix-type video image and providing a counter reading;

an insertion circuit operatively connected to said counter and receiving a video image signal and a frame intensity signal for generating an output signal from the video image signal and the frame intensity signal, said insertion circuit being controllable such that in response to given values of the counter reading, the output signal includes the frame intensity signal for producing a frame around the video image, the frame having a frame intensity; and an intensity control circuit connected to said insertion circuit for controlling the frame intensity as a function of the counter reading.

8. The device according to claim 7, wherein:

said insertion circuit receives the frame intensity signal as a signal having a chrominance component and a luminance component; and said intensity control circuit controls the luminance component.

9. The device according to claims 7, wherein said intensity control circuit is selectively connectable and disconnectable.

\* \* \* \* \*